United States Patent [19]
Taki et al.

[11] Patent Number: 5,742,570
[45] Date of Patent: Apr. 21, 1998

[54] CARTRIDGE AUTO-CHANGER

[75] Inventors: Yoshitsugu Taki; Takashi Otsuka; Taketoshi Yamagishi, all of Kanagawa, Japan

[73] Assignee: Sony Corporation, Japan

[21] Appl. No.: 694,271

[22] Filed: Aug. 8, 1996

[30] Foreign Application Priority Data

Aug. 15, 1995 [JP] Japan .................................. 7-228650

[51] Int. Cl.⁶ ............................ G11B 15/68; G11B 17/22
[52] U.S. Cl. ........................ 369/36; 369/178; 360/92
[58] Field of Search ..................... 369/34, 36, 178, 369/191, 192, 195; 360/92

[56] References Cited

U.S. PATENT DOCUMENTS

| | | | |
|---|---|---|---|
| 4,815,056 | 3/1989 | Toi et al. | 369/36 |
| 4,855,980 | 8/1989 | Hug et al. | 369/36 |
| 5,033,038 | 7/1991 | Kobayashi et al. | 369/36 |
| 5,128,912 | 7/1992 | Hug et al. | 369/38 |
| 5,150,341 | 9/1992 | Shibayama | 369/36 |
| 5,277,534 | 1/1994 | Anderson et al. | 414/281 |
| 5,293,284 | 3/1984 | Sato et al. | 360/92 |
| 5,442,500 | 8/1995 | Hidano et al. | 360/92 |
| 5,502,697 | 3/1996 | Taki | 369/34 |
| 5,546,366 | 8/1996 | Dang | 369/36 |

FOREIGN PATENT DOCUMENTS 60-261065  5/1986  Japan .

*Primary Examiner*—Stuart S. Levy
*Assistant Examiner*—William J. Kilmowicz
*Attorney, Agent, or Firm*—Ronald P. Kananen

[57] ABSTRACT

A cartridge auto-changer includes a main unit (12) within which a vertical array of shelves (4a) and disc drives (6a) are arranged, and a carrier (2) positioned behind the shelves and disc drives and moved in a vertical direction. An extension unit (22) includes a vertical array of shelves (4b), and disc drives (6b). The extension unit is removably attached to the back of the main unit through an attachment mechanism (23). This arrangement allows for mounting of additional shelves and disc drives, as may be needed.

9 Claims, 13 Drawing Sheets

CARTRIDGE AUTO-CHANGER

BACKGROUND OF THE INVENTION

The present invention relates to a cartridge auto-changer for automatically changing cartridges between a plurality of shelves and drives so as to continuously record on and/or reproduce recording media contained in such cartridges.

Japanese laid-open patent publication No. Sho 60-261065, as previously filed by the applicant of the present invention, discloses a cartridge auto-changer wherein a vertical array of shelves as cartridge containers and disc drives are arranged on one side of the path of travel of a carrier.

However, such a cartridge auto-changer can contain only 50 to 80 shelves and a few disc drives. No additional shelf or disc drive is contained since there is a limitation on the height of the auto-changer due to safety and operability concerns.

It is, therefore, an object of the present invention to overcome the foregoing problem and provide a cartridge auto-changer which can readily and safely accommodate more shelves and disc drives as the user's need arises.

SUMMARY OF THE INVENTION

According to one aspect of the present invention, there is provided a cartridge auto-changer which comprises a first housing including a panel in which a first opening is defined to receive the cartridges, and a second opening formed in a side opposite to the panel, a first stocker including a first plurality of openings formed in its one side adjacent to the second opening of the first housing and adapted to removably receive the cartridges stacked substantially in parallel in a first direction, a first drive mounted within the first housing and positioned to interfere with the first stocker in the first direction, the first drive including a port corresponding in position to the first plurality of openings and having access to the cartridges loaded and unloaded through the port, a second housing having a third opening at its one side, a second stocker mounted within the second housing and including a second plurality of openings formed in its one side adjacent to the third opening of the second housing and adapted to removably receive the cartridges stacked substantially in parallel in the first direction, a carrier mounted within the first housing and movable in the first direction, the carrier including a loading/unloading section for loading and unloading the cartridges, and a carrier body for holding the cartridges, means for connecting the first and second housings whereby the second opening of the first housing and the third opening of the second housing are communicated with one another to define an inner space, and means for turning the carrier between a first position wherein the loading/unloading section is able to load and unload the cartridges to and from the first stocker and the first drive, and a second position wherein the loading/unloading section is able to load and unload the cartridges to and from the second stocker.

According to another aspect of the present invention, there is provided an auto-changer which comprises a housing including a panel in which an opening is defined to receive the cartridges, a first stocker including a first plurality of openings formed in its one side adjacent to the opening of the housing and adapted to removably receive the cartridges stacked substantially in parallel in a first direction, a drive mounted within the housing and positioned to interfere with the first stocker in the first direction, the drive including a port corresponding in position to the first plurality of openings and having access to the cartridges loaded and unloaded through the port, a second stocker mounted within the housing at a position opposite to the first stocker, the second stocker including a second plurality of openings formed in its one side adjacent to the first stocker and adapted to removably receive the cartridges stacked substantially in parallel in the first direction, a carrier mounted within the housing and movable in the first direction, the carrier including a loading/unloading section for loading and unloading the cartridges, and a carrier body for holding the cartridges, means for turning the carrier between a first position wherein the loading/unloading section is able to load and unload the cartridges to and from the first stocker and the first drive, and a second position wherein the loading/unloading section is able to load and unload the cartridges to and from the second stocker.

An auto-changer further comprises a second drive mounted within the housing and positioned to interfere with the second stocker in the first direction. The second drive includes a port corresponding in position to the second plurality of openings and has access to the cartridges loaded and unloaded through the port.

Means for connecting comprises reference openings, reference pins adapted for insertion into the reference openings, means for securing the first and second housings, and means for adjusting the position of the reference openings relative to the reference pins.

Means for turning is mounted to the carrier and turned about a horizontal axis by 180°. The horizontal axis extends substantially parallel to the first or second stocker.

The first stocker and drive and the second stocker and drive are symmetrically positioned with respect to the path of travel of the carrier.

The recording media are recording discs.

DETAILED DESCRIPTION OF THE EMBODIMENT

Figure 1:
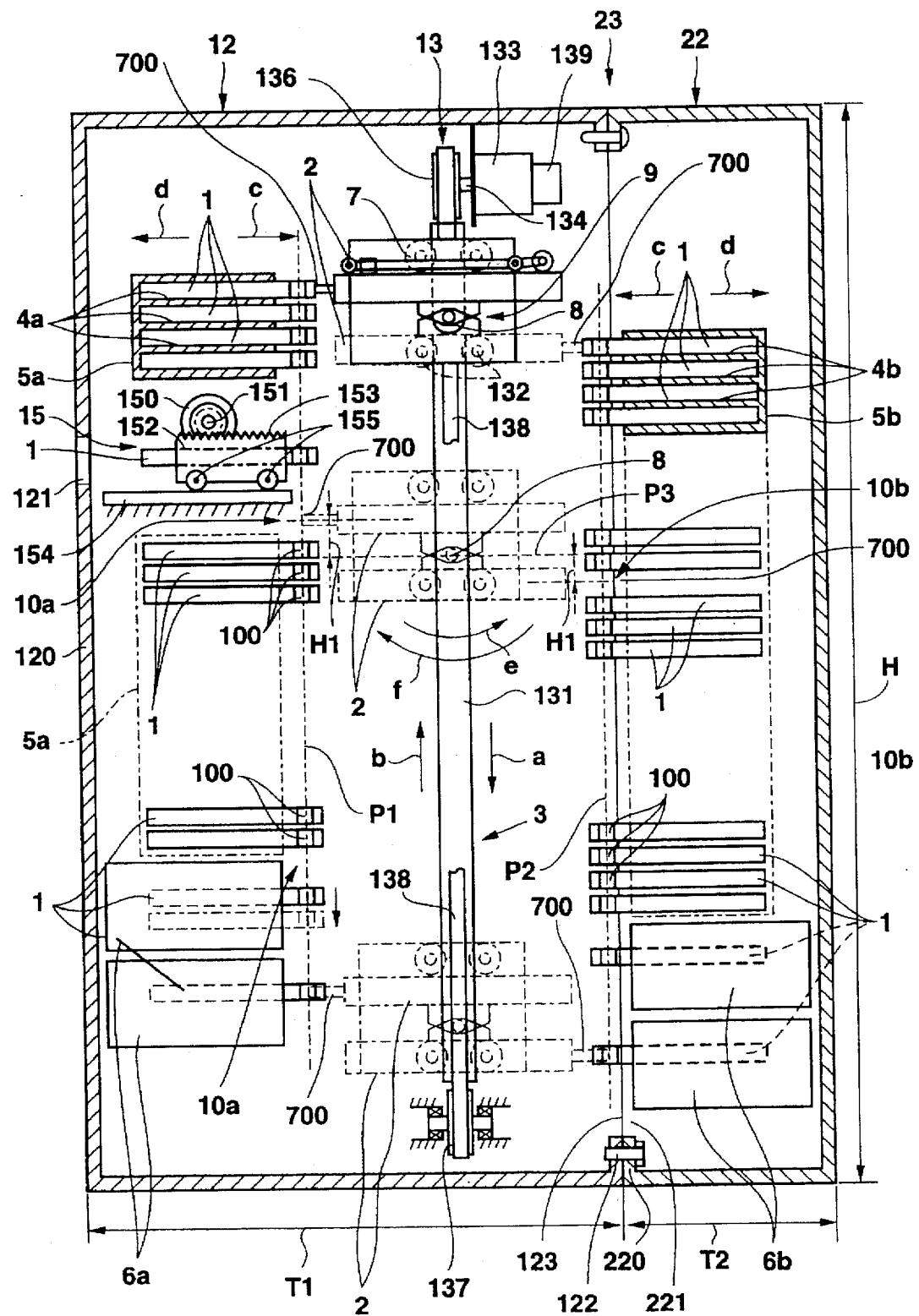
FIG. 1 is a side elevation, partly broken away, of a cartridge auto-changer according to one embodiment of the present invention.
Figure 2:
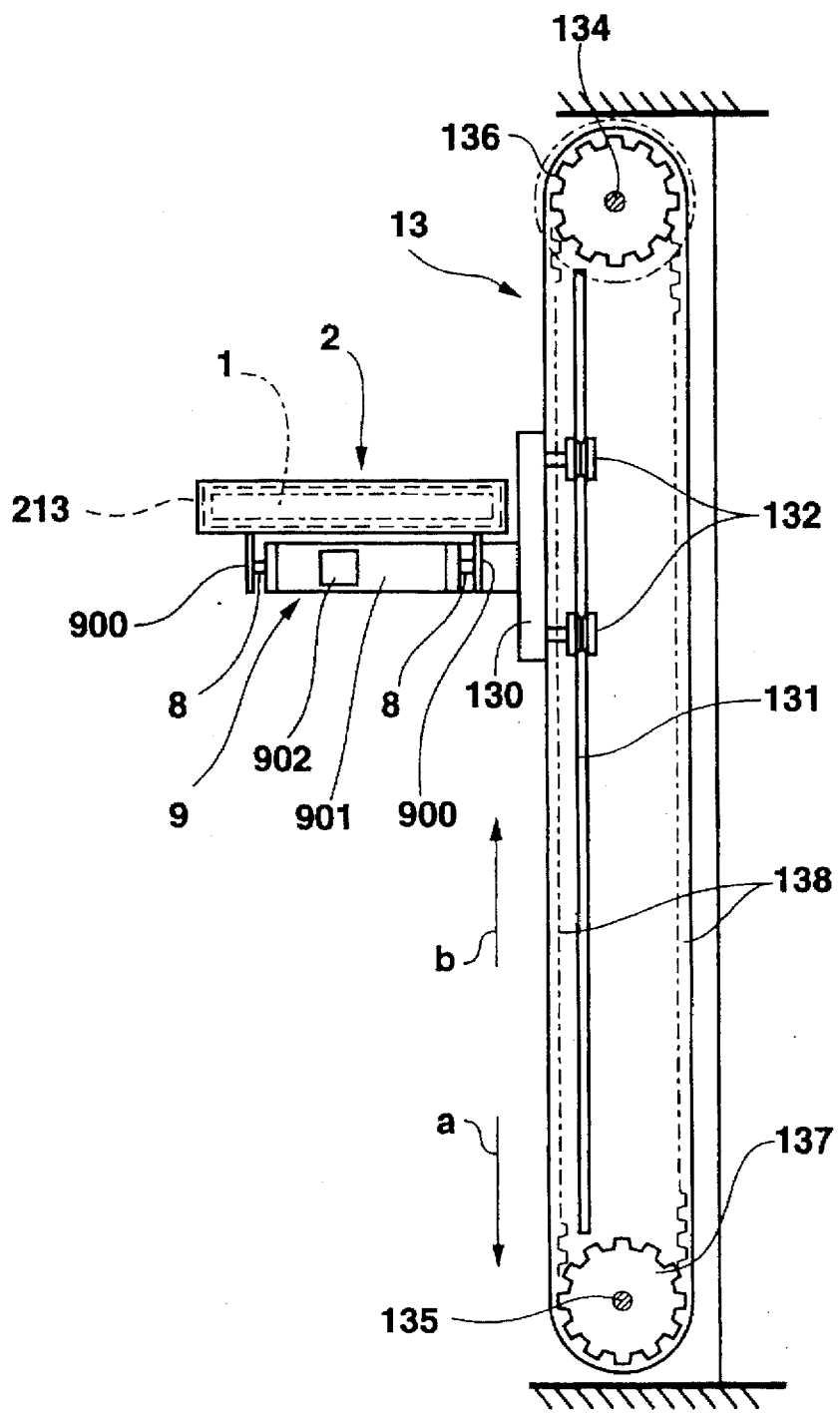
FIG. 2 is a side view of a carrier conveyance mechanism and a turning mechanism.

The present invention will now be described by way of example with reference to the accompanying drawings.

General Structure of Auto-changer

Referring first to FIGS. 1 to 5, there is illustrated a cartridge auto-changer.

This cartridge auto-changer employs optical discs as recording media, each of which is contained in a cartridge 1. Data or information can be recorded on both A- and B-sides (opposite sides) of each optical disc. The cartridge has a pair of right and left recesses 100 at its one end.

The auto-changer is composed of a main unit 12 and an extension unit 22. The main unit 12 and the extension unit 22 are in the form of rectangular housings and have an equal height H. The extension unit 22 has a depth $T_2$ one half of the depth $T_1$ of the main unit 12.

The main unit 12 has a front face or panel 120. A cartridge loading slot 121 is defined in the front panel 120 of the main unit 12 at a position intermediate its height. The main unit 12 has a rear face 122 in which a rear opening 123 is defined. The rear opening 123 extends along substantially the total height of the rear face 122.

The extension unit 22 has a front face 220 in which a front opening 221 is defined. The front opening 221 extends along substantially the total height of the front face 220.

Figure 5:
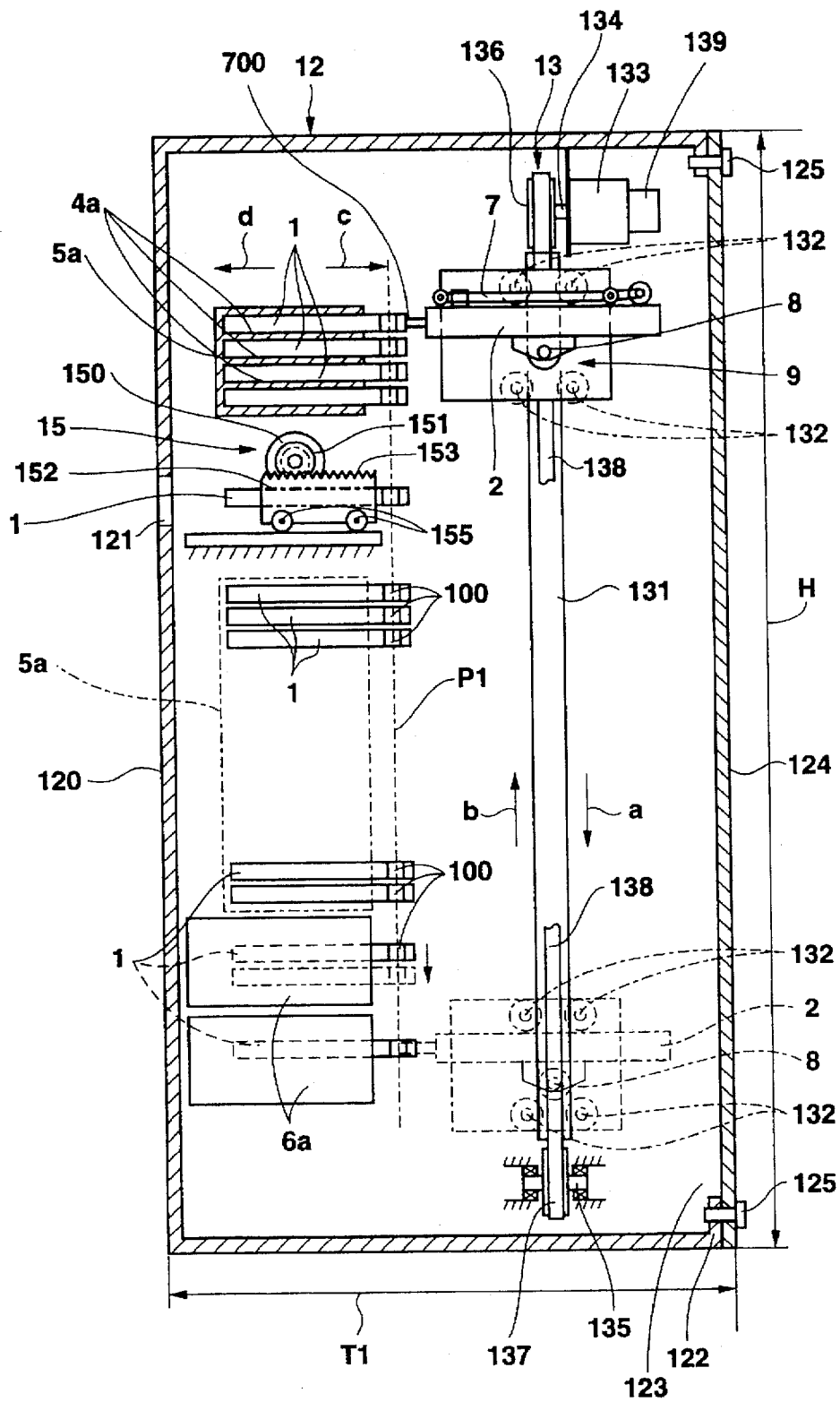
FIG. 5 is a side view, partly broken way, of the main unit only.

As shown in FIG. 5, the auto-changer may be composed only of the main unit 12. In such a case, a rear panel 124 may be detachably mounted to the rear face 122 of the main unit 12 by a plurality of screws 125 so as to close the rear opening 123 in use.

Referring to FIGS. 1 to 4, the auto-changer is structured to allow for ready attachment of the extension unit 22 to the main unit 12, as may be needed, through attachment mechanism 23 which will be described later. To attach the extension unit 22, the rear panel 124 is first removed from the main unit 12. The front opening 221 of the extension unit 22 is then brought into communication with the rear opening 123 of the main unit 12.

A vertical array of stockers 5a and disc drives 6a are arranged within the main unit 12 adjacent to the front panel 120. Each of the stockers 5 is composed of a plurality of horizontal shelves 4a arranged one above the other. The shelves 4a and the disc drives 6a are all directed or opened rearwardly (toward the extension unit 22) so that the cartridge 1 can be inserted in the direction of the arrow d or removed in the direction of the arrow c.

A carrier travel path 3 extends vertically within the main unit 12 and is defined in a position opposite the shelves 4a and the disc drives 6a. A carrier 2 is moved up and down or in directions of the arrows a and b by a carrier conveyance mechanism 13.

A vertical array of stockers 5b and disc drives 6b are also arranged within the extension unit 22. Each of the stockers 5 is composed of a plurality of horizontal shelves 4b arranged one above the other. The shelves 4b and the disc drives 6b are all directed or opened forwardly (toward the main unit 12) so that the cartridge 1 can be inserted in the direction of the arrow d or removed in the direction of the arrow c.

When the extension unit 22 is attached to the back of the main unit 12, the front array of the shelves 4a and the disc drives 6a and the rear array of the shelves 4b and the disc drives 6b are located on opposite sides of the carrier travel path 3 of the carrier 2 with their open ends oriented to face against each other.

The disc drives 6a, 6b are heavier than and located below the shelves 4a, 4b. An optical pickup is mounted within each of the disc drives 6a, 6b so as to record and/or reproduce information with respect to A-side and B-side of an optical disc D.

The cartridges 1 are received within the corresponding front and rear shelves 4a, 4b with their front faces oriented to face against each other. The cartridge 1 has a pair of right and left recesses 100 which are located outside of the front and rear shelves 4a, 4b and the front and rear disc drives 6a, 6b and extend along a pair of front and rear vertical reference lines $P_1$, $P_2$.

The carrier 2 includes a loading/unloading mechanism 7. The loading/unloading mechanism 7 has a pair of right and left pawls 700 which are engageable with the right and left recesses 100 of each cartridge 1 at only one side 200 of the carrier 2 so as to load and unload the cartridge 1 in directions indicated by the arrows d and c, respectively. The cartridge 1 is loaded or unloaded in a horizontal direction or in a direction at right angles to the direction in which the carrier 2 is moved.

A turning mechanism 9 is provided to rotate the carrier 2 about a horizontal pin 8 in a direction indicated by the arrow e or f. As this occurs, the loading/unloading mechanism 7 is turned by 180° to cause the right and left pawls 700 to face either the front shelf 4a or the rear shelf 4b.

The right and left pawls 700 are moved out of the right and left recesses 100 in a vertical direction indicated by the arrow a or b. The right and left pawls 700 are thereafter withdrawn into the carrier 2 in a horizontal direction indicated by the arrow c. The carrier 2 is then free to rotate 180° in the direction of the arrow e or f. To this end, a plurality of spaces 10a, 10b are defined in the front and rear shelves 4a, 4b, respectively.

The spaces 10a, 10b are vertically offset from one another by an amount $2*H_1$. The right and left pawls 700 are directed toward the space 10a when the carrier 2 is in its original position and toward the space 10b when the carrier 2 is turned by 180° to its inverted position.

Referring specifically to FIGS. 1 to 10, the right and left pawls 700 are offset from the center $P_6$ of the pivot pin by an amount $H_1$ when the carrier 2 is in its original position. When the carrier 2 is turned around the pivot pin 8 in the direction of the arrow e or f, the right and left pawls 700 are also offset from the center $P_6$ of the pivot pin by an amount $H_1$. To this end, the spaces 10a, 10b are offset from one another by an amount $2*H_1$.

Automatic Change of Cartridges in the Main Unit

As shown in FIG. 5, the auto-changer is composed only of the main unit 12. To automatically change cartridges 1 within the main unit 12, the right and left pawls 700 of the loading/unloading mechanism 7 are directed toward a front array of shelves 4a.

The carrier 2 is then moved vertically in a direction indicated by the arrows a or b. As the carrier 2 reaches a target shelf 4a, the right and left pawls 700 of the loading/unloading mechanism 7 are brought into engagement with the corresponding right and left recesses 100 of the target shelf 4a. The cartridge 1 is withdrawn from the target shelf 4a and then, moved in the direction of the arrow c for introduction into the carrier 2.

The carrier 2 is moved in the direction of the arrow a to move the cartridge 1 to a target disc drive 6a. Thereafter, the right and left pawls 700 are operable to move the cartridge 1 in the direction of the arrow d and insert it into the target disc drive 6a. Information is then recorded on and/or reproduced from the optical disc D within the cartridge 1 by the target disc drive 6a.

After the information has been recorded or reproduced, the cartridge 1 is moved in a reverse order and returned to the original shelf 4a. This completes automatic change of the cartridges 1 relative to the disc drive 6a. It will be appreciated that while a certain disc drive 6a is operated to record on and/or reproduce information, another cartridge 6a may automatically be moved from one disc drive 6a to another.

Automatic Change of Cartridges when Extension Unit is added to the Main Unit

As shown in FIGS. 1 to 4, the auto-changer is composed of both the main unit 12 and the extension unit 22. To automatically change the cartridge 1 within the extension unit 22, the turning mechanism 9 is operable to turn the carrier 180° in the direction of the arrow e so as to direct the right and left pawls 700 of the loading/unloading mechanism 7 toward a rear array of shelves 4b.

The carrier 2 is rapidly moved in the direction of the arrow a or b. As the carrier 2 reaches a target shelf 4b, the right and left pawls 700 of the loading/unloading mechanism 7 are brought into engagement with the right and left recesses 100 of the cartridge 1. The cartridge 1 is then withdrawn from the target shelf 4b and moved in the direction of the arrow c for introduction into the carrier 2.

The carrier 2 is moved in the direction of the arrow a to move the cartridge 1 to a target disc drive 6b. Thereafter, the right and left pawls 700 are operable to move the cartridge 1 in the direction of the arrow d and insert it into the target disc drive 6b. Information is then recorded on and/or reproduced from the optical disc D within the cartridge 1 by the target disc drive 6b.

After the information has been recorded or reproduced, the cartridge 1 is moved in a reverse order and returned to the original shelf 4b. This completes automatic change of the cartridges 1 relative to the disc drive 6b. It will be appreciated that while a certain disc drive 6b is operated to record on and/or reproduce information, another cartridge 6a may automatically be moved from one disc drive 6a to another.

Where the extension unit 22 is added to the back of the main unit 12, the cartridges 1 are automatically changed between the front and rear arrays of shelves 4a, 4b and the disc drives 6a, 6b while the turning mechanism 9 is rotating the carrier 2 in the direction of the arrow e or f by 180°.

When a target shelf is being searched, the right and left pawls 700 are located at the reference position $P_1$ or $P_2$ within the path of travel 3 of the carrier 2. This position allows the right and left pawls 700 to be rapidly moved in the direction of the arrow a or b and passed through the right and left recesses 100 of the cartridges 1 contained within the front and rear arrays of shelves 4a, 4b.

When the carrier 2 is rotated in the direction of the arrow e or f by 180° by the turning mechanism 9, the right and left pawls 700 are moved in the direction of the arrow a or b. This movement removes the right and left pawls 700 from the recesses 100 of the cartridge 1 within one of the spaces 10a, 10b as shown by broken line in FIG. 1. The right and left pawls 700 are then withdrawn into the carrier 2 in the direction of the arrow c. The carrier 2 is thereafter rotated in the direction of the arrow e or f by 180°. This rapidly brings the right and left pawls 700 into engagement with the recesses 100 of the cartridge 1 within the other space.

The main unit 12 per se can accommodate only 50 to 80 shelves 4a and a few disc drives 6a.

Simply by adding the extension unit 22 to the main unit 12, the number of the shelves 4a, 4b and the disc drives 6a, 6b can be approximately doubled.

Advantageously, addition of the extension unit 22 to the back of the main unit 12 results in no change in the height H of the entire auto-changer and insures safety and operability.

Details of the Auto-changer

Various components of the auto-changer will now be described in detail.

Attachment Mechanism

FIGS. 3, 4, 6 and 7 illustrate the structure of the attachment mechanism 23.

Specifically, the main unit 12 has a pair of right and left vertical frames 126a, 126b at its rear face. A pair of right and left vertical connecting plates 23a, 23b have a substantially L-shaped section and include respective side plates 23aa, 23bb. A plurality of elongated openings 24a, 24b are formed in the side plates 23aa, 23bb, respectively. A plurality of corresponding screws 25a, 25b pass through the horizontal elongated openings 24a, 24b to secure the connecting plates 23a, 23b to the vertical main unit frames 126a, 126b, respectively. The elongated openings 24a, 24b permit adjustment of the connecting plates 23a, 23b in the direction of the arrow g.

The connecting plate 23a has a rear plate 23aaa in which a pair of upper and lower horizontal elongated openings 27 are defined. A pair of upper and lower reference plates 26 are secured to the connecting plate 23a by a plurality of screws 28. The horizontal elongated openings 27 permit lateral adjustment of the reference plates 26, that is, in a direction indicated by the arrow h. A vertical elongated opening 29 is formed centrally in each of the upper and lower reference plates 26. A pair of upper and lower recesses 30 are formed in the rear plate 23aaa of the connecting plate 23a. The elongated openings 29 are exposed rearwardly through these recesses 30.

The other connecting plate 23b has a rear plate 23bbb to which a plurality of upper and lower nuts 31 are attached. The upper and lower nuts 31 are directed rearwards.

The extension unit 22 has a pair of left and right frames 222a, 222b at its front face 220. A pair of upper and lower reference pins 32 extend forwardly and horizontally from one of the extension unit frames 222a, 222b and have pointed ends. A plurality of forwardly directed upper and lower screws 33 are horizontally attached to the left and right extension unit frames 222a, 222b.

Within the main unit 12, the stockers 5a and the disc drives 6a are attached to the left and right frames 127a, 127b through a mount 128. Within the extension unit 22, the stockers 5b and the disc drives 6b are attached to the left and right frames 222a, 222b through a mount 223.

The stockers 5a and the disc drives 6a within the main unit 12 and the stockers 5b and the disc drives 6b within the extension unit 22 are symmetrically arranged with respect to the path 3 of travel of the carrier 2. Advantageously, the mounts 128 and 223 share parts and can be used in either unit. This results in a decrease in the fabrication cost of the auto-changer.

With the attachment mechanism thus constructed, the upper and lower reference pins 32 are inserted through the upper and lower reference openings 29, respectively. The upper and lower screws 33 are then threaded into the upper and lower nuts 31, respectively. This arrangement permits ready attachment and detachment of the extension unit 22 to and from the back of the main unit 12.

To enable the carrier 2 within the main unit 12 to search and accurately detect a target shelf 4b or a target disc drive 6b within the extension unit 22, there is provided a carrier stop position detecting mechanism 14b which will be described later. This eliminates the need to accurately align the height of the extension 22 with that of the main unit 12.

And yet, it is necessary to accurately align a cartridge center $P_5$ with a cartridge center $P_4$ of the main unit 12. Also, the distance $L_1$ between a center $P_6$ of the pivot pin 8 and the reference line $P_1$ must be equal to the distance $L_2$ between the center $P_6$ and the reference line $P_2$.

Figure 6:
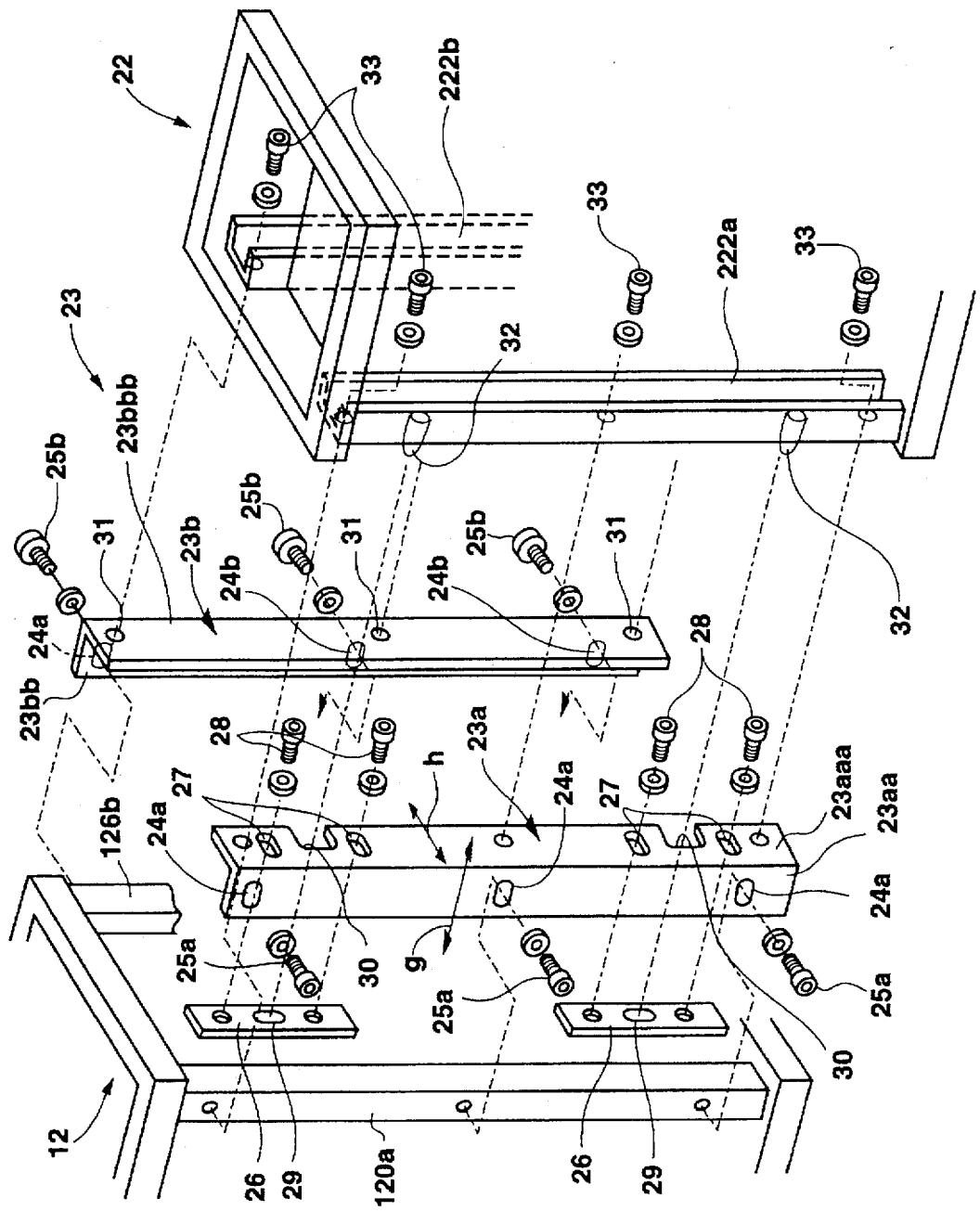
FIG. 6 is an exploded perspective view showing the manner in which the extension unit is releasably secured to the main unit.

To this end, the reference plate 26 of the main unit 12 is adjusted relative to the connecting plate 23a laterally or in the direction of the arrow h by a combination of the elongated openings 27 and screws 28 as a position adjustment means, as shown in FIG. 6, such that the distance $L_3$ between a center $P_7$ of the reference opening 29 in the reference plate 26 and the cartridge center $P_4$ is made equal to the distance $L_4$ between a center $P_5$ of the reference pin 32 in the extension unit 12 and cartridge center $P_5$.

Also, the left and right connecting plates 23a, 23b are adjusted relative to the left and right frames 126a, 126b of the main unit 12 longitudinally or in the direction of the arrow g by a combination of the elongated openings 24a, 24b and screws 25a, 25b as a position adjustment means, as shown in FIG. 6 such that the distances $L_1$ and $L_2$ are made equal. At this time, the distance Ls between the frames 222a, 222b of the extension unit 22 and the center $P_8$ of the pivot pin 8 needs adjustment.

Again, the extension unit 22 can readily be attached to the back of the main unit 12 by the use of the reference pins 32 and the screws 33. This attachment permits accurate alignment of the cartridge centers $P_4$, $P_5$ and the distances $L_1$, $L_2$ without any adjustment.

Carrier Conveyance Mechanism

Referring to FIGS. 1 to 4, the carrier conveyance mechanism 13 is vertically arranged at the rear portion the main unit 12 and adapted to move the carrier 2 along the path 3 of travel of the carrier in the direction of the arrow a or b.

The carrier conveyance mechanism 13 includes a conveyance table 130 to which the carrier 2 is mounted via the turning mechanism 9, a vertical rail 131 to which the conveyance table 130 is mounted through a plurality of guide rollers 132 and moved in the direction of the arrows a and b, a motor 133, an upper or drive shaft 134 and lower or driven shaft 135 driven for rotation in opposite directions by the motor 133, a pair of timing pulleys 136, 137 attached to the drive and driven shafts 134, 135, and a timing belt 138 vertically extending between the timing pulleys 136, 137. A part of the timing belt 138 is secured to the conveyance table 130.

By this arrangement, the motor 133 is energized to rotate the drive shaft 134. The timing belt 138 is then rotated in the direction of the arrow a or b so as to rapidly convey the carrier 2 on the conveyance table 130 along the guide rail 131. A rotary encoder 139 is directly mounted to the motor 133 and adapted to detect the amount of movement of the carrier 2 in the direction of the arrow a or b. Also, the carrier stop position detecting mechanism 14b is operable to search the shelves 4a, 4b, the disc drives 6a, 6b and the cartridge loading slot 121 and to control the motor 133 in a manner to stop the carrier 2 at a selected position.

Unidirectional Loading/Unloading Mechanism

Figure 8:
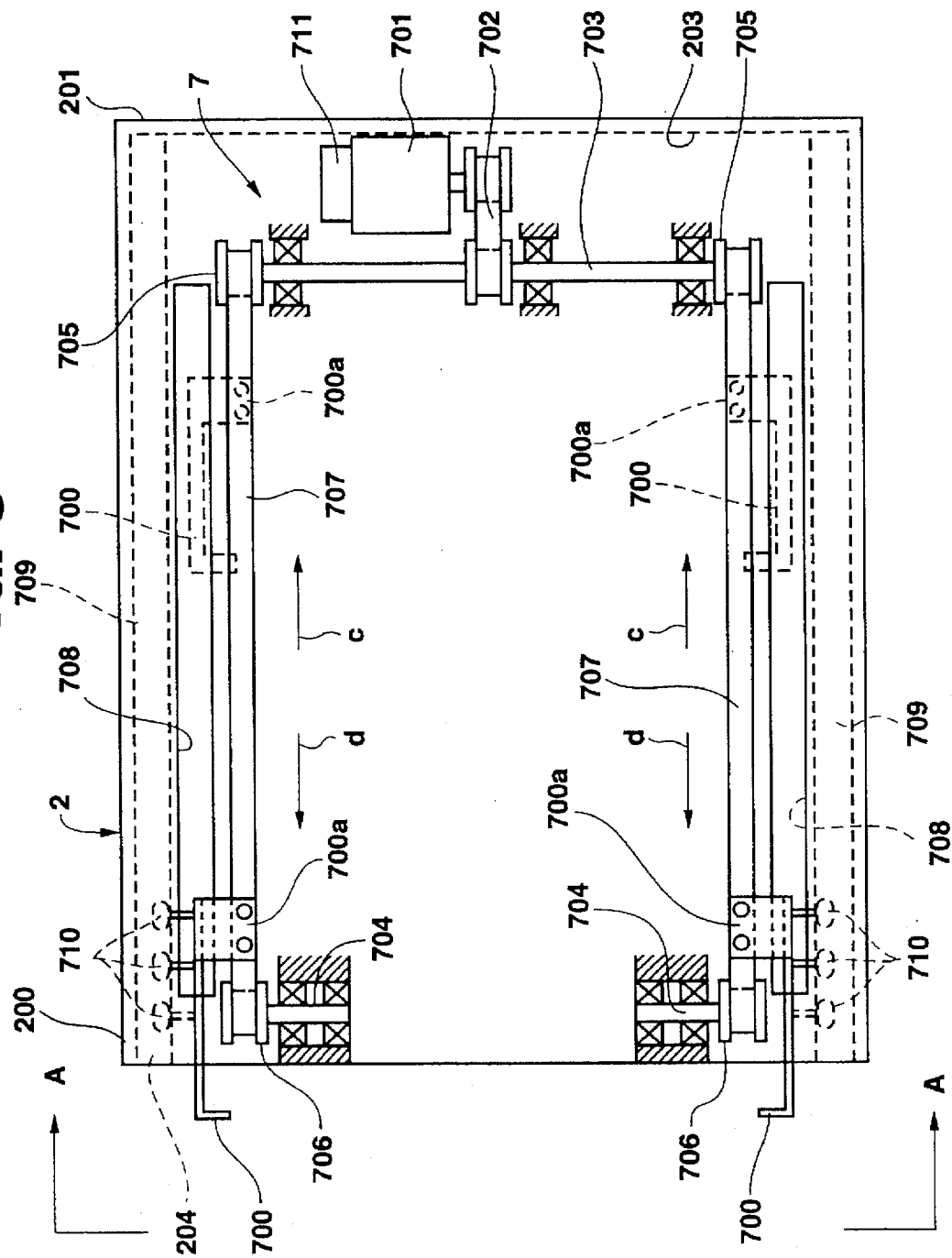
FIG. 8 is a plan view, partly broken away, of a unidirectional loading/unloading mechanism.
Figure 9:
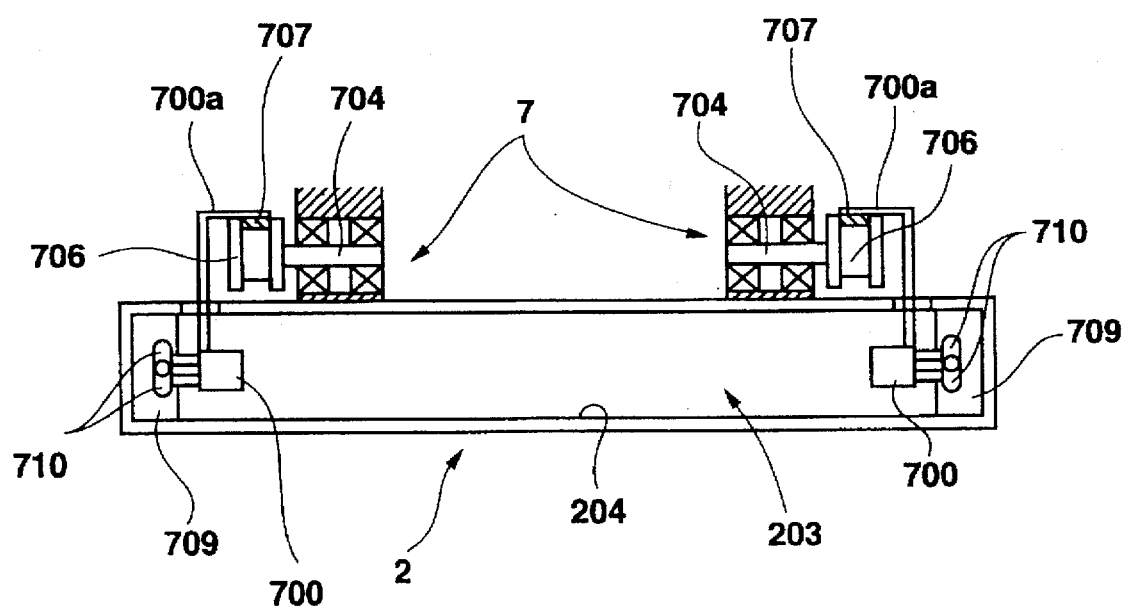
FIG. 9 is a side view taken on the line A—A in FIG. 8.
Figure 10:
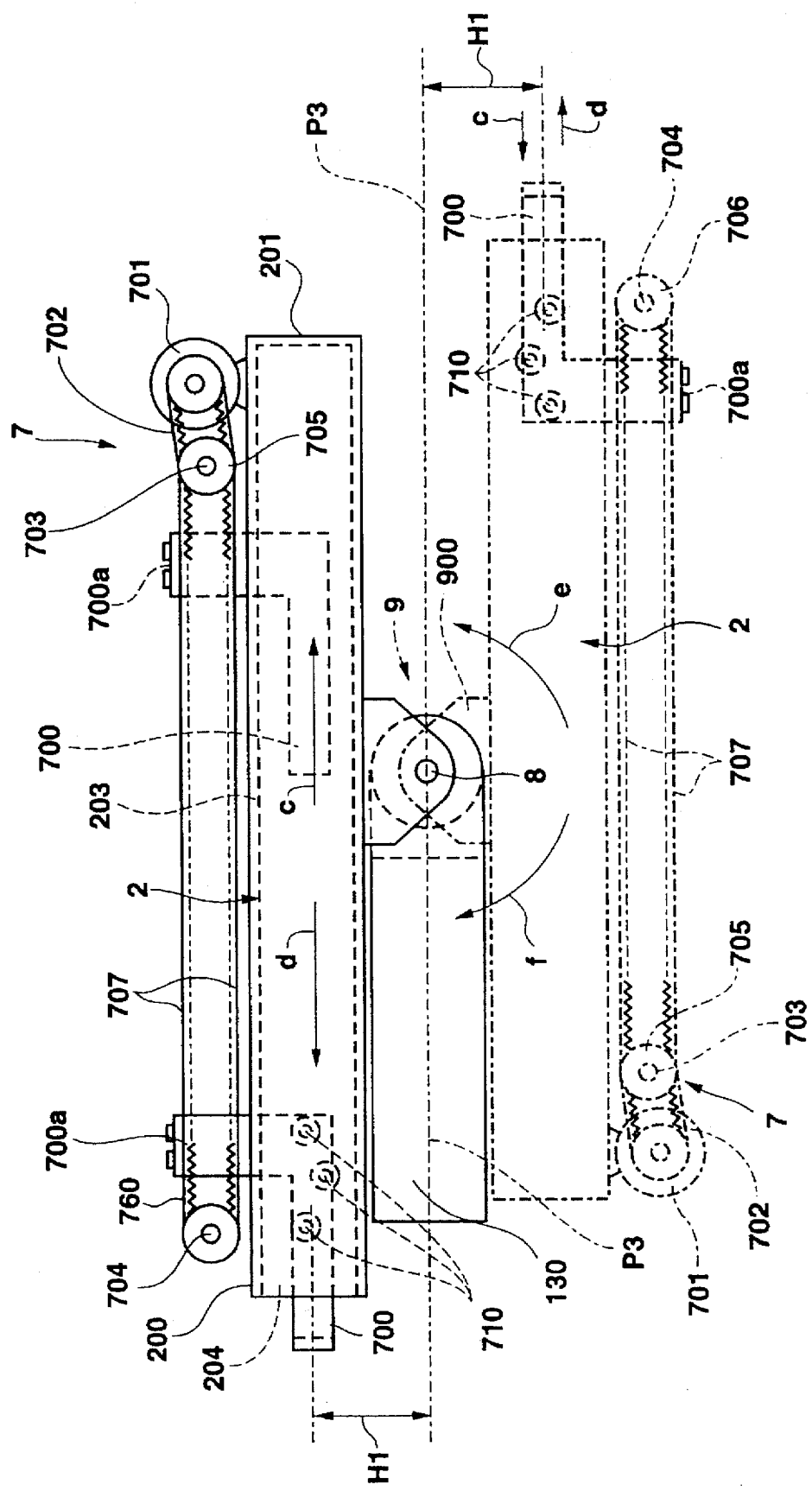
FIG. 10 is a side view of the turning mechanism.
Figure 11:
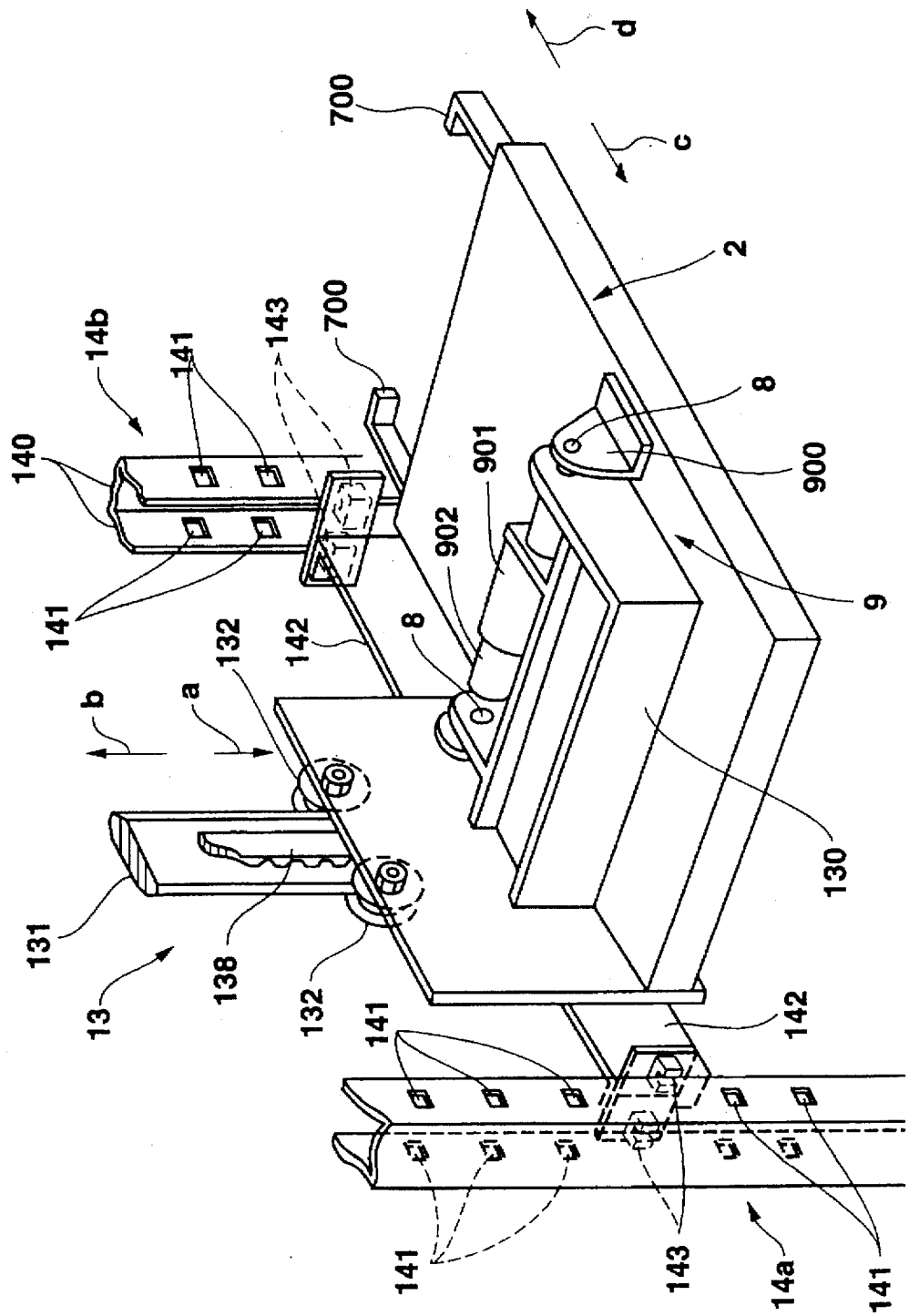
FIG. 11 is a perspective view of the turning mechanism and a carrier stop position detecting mechanism.

Referring next to FIGS. 8 to 10, the unidirectional loading/unloading mechanism 7 is mounted to the top of the carrier 2. The loading/unloading mechanism 7 includes a drive shaft 703 rotatable in opposite directions by a motor 701 through a timing belt 702, a pair of driven shafts 704, a pair of timing pulleys 705 attached to opposite ends of the drive shaft 703, another pair of timing pulleys 706 attached to the driven shafts 704, and a pair of right and left timing belts 707 trained around the timing pulleys 705, 706 and extending parallel to one another between the driven shafts 703 and the driven shafts 704. The right and left pawls 700 are laterally symmetrical and have a substantially L-shape.

The carrier 2 has a cartridge loading space 203. The right and left pawls 700 are located at opposite sides of the cartridge loading space 203 and have upper ends 700a. The carrier 2 has a pair of right and left slits 708 through which the upper ends 700a of the pawls 700 extend upwardly from the carrier 2 and are fixedly secured to the timing belts 707. A pair of right and left guide rails 709 are located at opposite sides of the cartridge loading space 203 and extend in parallel to one another. The right and left pawls 700 are engaged with the right and left guide rails 709 via a plurality of guide rollers 710.

By this arrangement, the motor 701 is energized to rotate the drive shaft 703 in either direction through the timing belt 702. The right and left timing belts 707 are simultaneously rotated in a direction indicated by the arrow c or d so as to translate or move the pawls 700 to an extended position shown by solid line in FIGS. 8 and 10 or to a retracted position shown by broken line in FIGS. 8 and 10. A rotary encoder 711 is directly connected to the motor 701 and is operable to detect the amount of movement of the right and left pawls 700. The motor 701 is controlled so as to stop the pawls 700 when they are moved to the extended position or the retracted position.

After the right and left pawls are engaged with the right and left recesses 100 of the cartridge 1, they are moved in the direction of the arrow c or d so as to load or unload the cartridge 1 into or from the cartridge loading space 203 through the cartridge loading slot 204.

Turning Mechanism

Referring to FIGS. 1 to 4 and 10 to 12, the turning mechanism 9 includes a pair of coaxial pivot pins 8 rotatably mounted to the conveyance table 130 and extending in a horizontal direction or in a direction at right angles to the direction in which the carrier 2 is conveyed. A pair of brackets 900 are secured to one side of the carrier 2. The pivot pins 8 have one ends secured to the brackets 900.

A motor 901 is mounted on the conveyance table 130. The motor 901 is energized to rotate one of the pivot pins 8 in the direction of the arrow e or f. The carrier 2 is then rotated around the pivot pin 8 by 180° and moved between a position where the one side 200 of the carrier 2 is directed toward the shelf 4a in the front array, as shown by solid line in FIG. 10, and a position where the one side 200 of the carrier 2 is directed toward the shelf 4b in the rear array, as shown by broken line in FIG. 10. A rotary encoder 902 is directly connected to the motor 901 and operable to detect the angular position of the carrier 2. The motor 901 is controlled in a manner to stop the carrier 2 when it is moved to the inverted position.

Carrier Stop Position Detecting Mechanism

As shown in FIGS. 1 to 4 and 11, a pair of carrier stop position detecting mechanisms 14a, 14b are included in the main unit 12 and the extension unit 222, respectively and are operable to detect the position of the shelves 4a, 4b in the front and rear arrays, the disc drives 6a, 6b and the cartridge loading slots 121 so as to stop the carrier 2 in a selected position.

The carrier stop position detecting mechanisms 14a, 14b have a substantially U-shaped section and each include a pair of front and rear position detecting plates 140. The mechanism 14a extend vertically along one side of the front array of shelves 4a and the disc drives 6a. The mechanism 14b extend vertically along one side of the rear array of shelves 4b and the disc drives 6b. A pair of brackets 142 extend from the front and rear ends of the conveyance table 130. A pair of position sensors 143 such as photointerrupters are mounted to the distal end of each of the brackets 142. There is thus provided a total of four position sensors.

When the carrier 2 is rapidly moved in the direction of the arrow a or b by the carrier conveyance mechanism 13, the position sensors 143 are operable to detect the slits or apertures of each position detecting plates 140 sequentially in the direction of the arrow a or b and search the shelves 4a, 4b, the disc drives 6a, 6b and the cartridge loading slots 121. The motor 133 of the carrier conveyance mechanism 13 is controlled in a manner to stop the carrier 2 at a selected position.

As previously explained, the spaces 10a, 10b are located between the front and rear arrays of shelves 4a, 4b and vertically offset from one another by an amount $2*H_3$.

Cartridge Loading Mechanism

Referring to FIG. 1, a cartridge loading mechanism 15 is located within the main unit 12 between the front array of shelves 4a and positioned inwardly from the cartridge loading slot 121 to receive the cartridge 1 through the cartridge loading slot 121.

The cartridge loading mechanism 15 includes a pinion 151 rotated in either direction by a motor 150, and a tray 152 on which a rack 153 is formed. The motor 150 is energized to rotate the pinion 151 so as to drive the rack 153. The tray 154 is then caused to move, in the direction of the arrow c or d, on a guide rail 154 through a plurality of rollers 155.

Attachment Arrangement of Motor and Dummy Motor of Turning Mechanism

Figure 7:
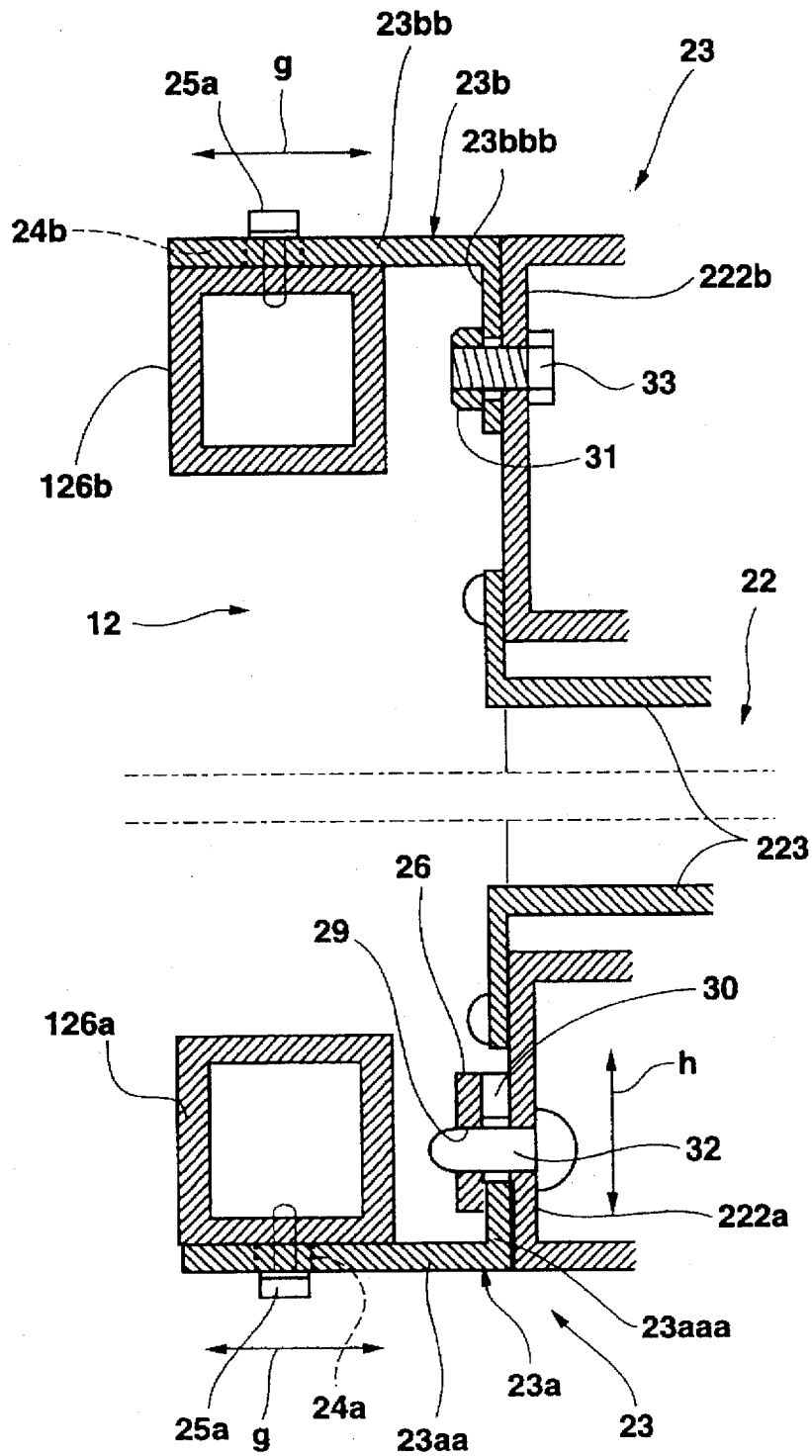
FIG. 7 is a horizontal section, on an enlarged scale, showing the principal part of the units shown in FIG. 6.

As shown in FIG. 7, the auto-changer may be composed only of the main unit 12 per se, or a combination of the main unit 12 and the extension unit 22 added to the back of the main unit 22.

Where the auto-changer is composed only of the main unit 12 as shown in FIG. 5, there is no need to rotate the carrier 2 since the cartridges 1 are moved between the front arrays of shelves 4a and the disc drives 6a.

On the other hand, where the extension unit 22 is added to the back of the main unit 12 as shown in FIGS. 1 to 4, it is necessary to rotate the carrier 2 by 180° since the cartridges 1 need to be moved between the front and rear arrays of shelves 4a, 4b and the disc drives 6a, 6b.

Figure 12:
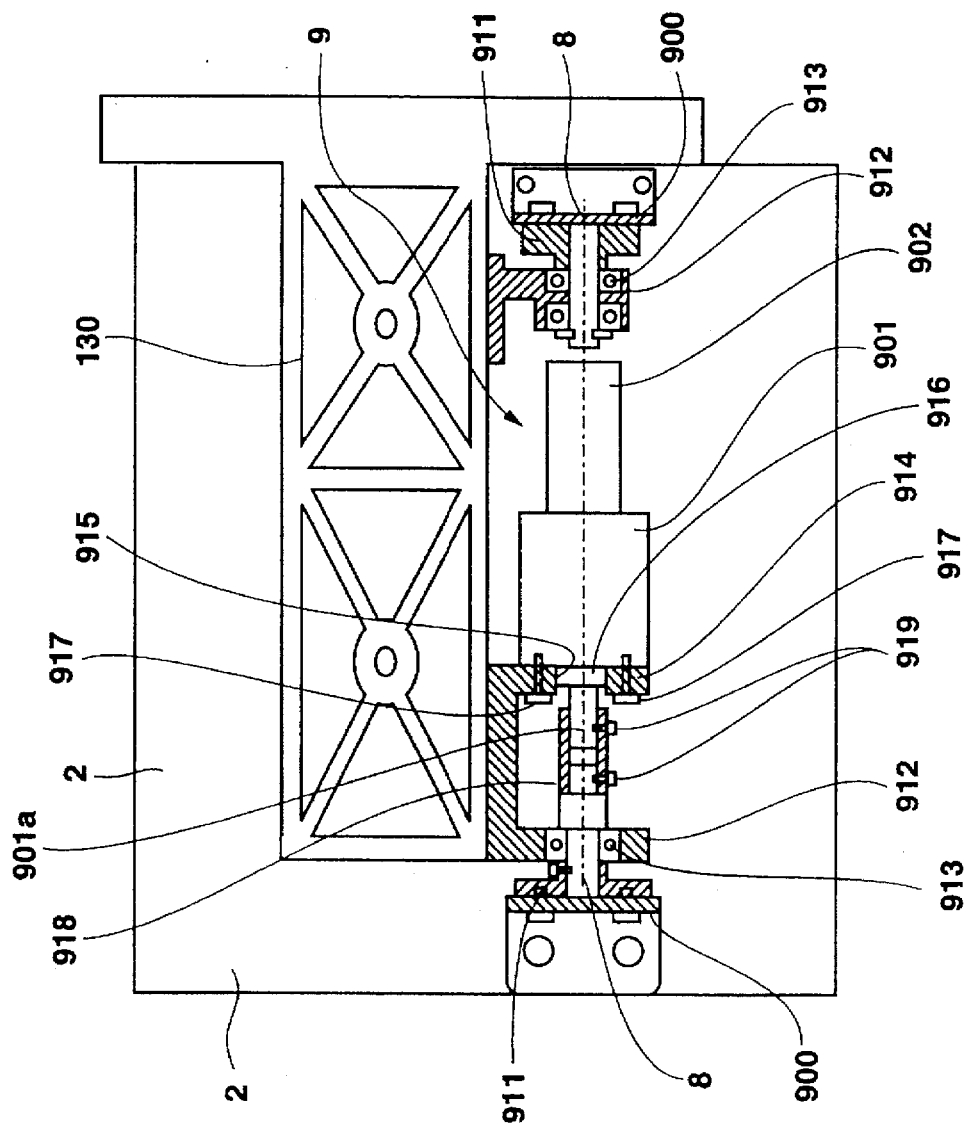
FIG. 12 is a plan view, partly broken away, showing details of the turning mechanism.

To this end, a pair of bracket rings 911 are fixed to the corresponding brackets 900 which are, in turn, mounted to the bottom of the carrier 2, as shown in FIG. 12. The pivot pins 8 have outer ends secured coaxially to the bracket rings 911 and inner ends rotatably supported by a corresponding pair of bearing holders 912 through a pair of bearings 913. The bearing holders 912 are fixed to the conveyance table 130.

A motor holder 914 is fixed to the conveyance table 130 and has a spigot socket or hole 915 defined coaxially with the pivot pins 8. The motor 901 is integral with the encoder 902 and has a projection 916 which is releasably fit in the spigot socket 915. With the projection 916 fit in the spigot socket 915, the motor 901 is secured to the motor holder 914 by a plurality of screws 917.

The motor 901 has an output shaft 901a which is releasably connected coaxially to one of the pivot pins 8 by a joint 918 and a plurality of screws 919.

Figure 13:
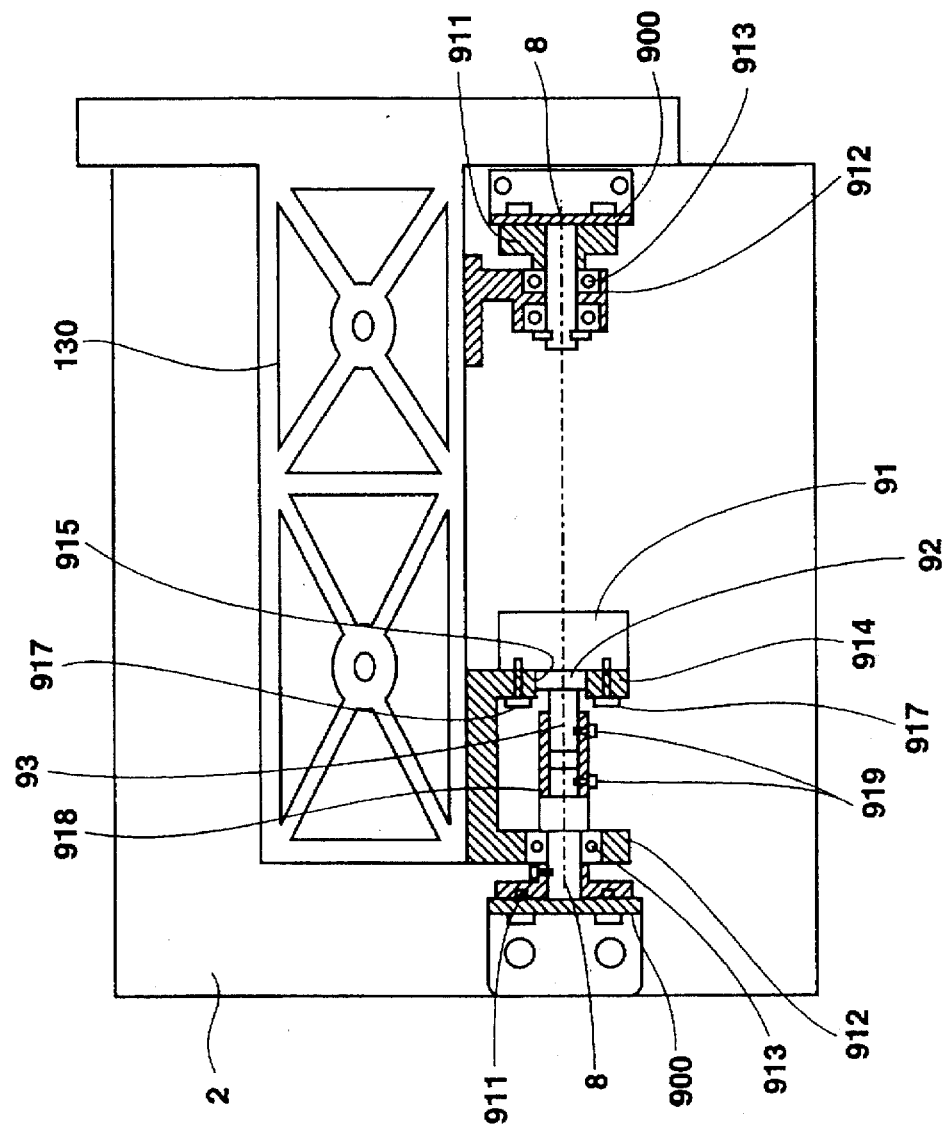
FIG. 13 is a plan view, partly broken away, of the turning mechanism where a motor is replaced by a dummy motor.

In the event that the auto-changer is composed only of the main unit 12 as shown in FIG. 5, the screws, shown in FIG. 12, are untightened to remove the motor 901 from the motor holder 914. As shown in FIG. 13, a dummy motor 91 has a projection 92 which is releasably fit in the spigot socket 915 of the motor holder 914. The screws 917 are again used to secure the dummy motor 91 to the motor holder 914.

The dummy motor 91 has a non-rotatable shaft 93 This shaft 93 is releasably connected to one of the pivot pins 8 through the joint 918 and the screws 919 so as to fix the carrier 2 horizontally to the conveyance table 130 with the right and left pawls 700 of the unidirectional loading/ unloading mechanism 7 being directed toward the front array of shelves 4a.

When only the main unit 12 is employed, the motor 901 is replaced by the dummy motor 91 which has the same spigot structure as the motor 901. In this way, the carrier 2 can readily be secured to the conveyance table 130 without the need to change any other parts. In other words, addition of the extension unit only requires replacement of the motors. This results in an improvement in the operability and brings about a reduction in the fabrication cost of the auto-changer.

Reference will now be made to the operation of the auto-changer when the extension unit 22 is added to the back of the main unit 12 as shown in FIGS. 1 to 4.

Loading of Cartridge

When the cartridge 1 is inserted through the cartridge loading slot 121 in the direction of the arrow c, the tray 152 in the cartridge loading mechanism 15 is moved in the direction of the arrow c so as to withdraw the cartridge 1 into a shelf 4a in the front array from the cartridge loading slot 121.

The carrier conveyance mechanism 13 is then operable to move the carrier 2 to the cartridge loading slot 121 with the right and left pawls 700 being extended to the front reference line $P_1$. The right and left pawls 700 are brought into engagement with the right and left recesses 100 of the cartridge 1.

Figure 3:
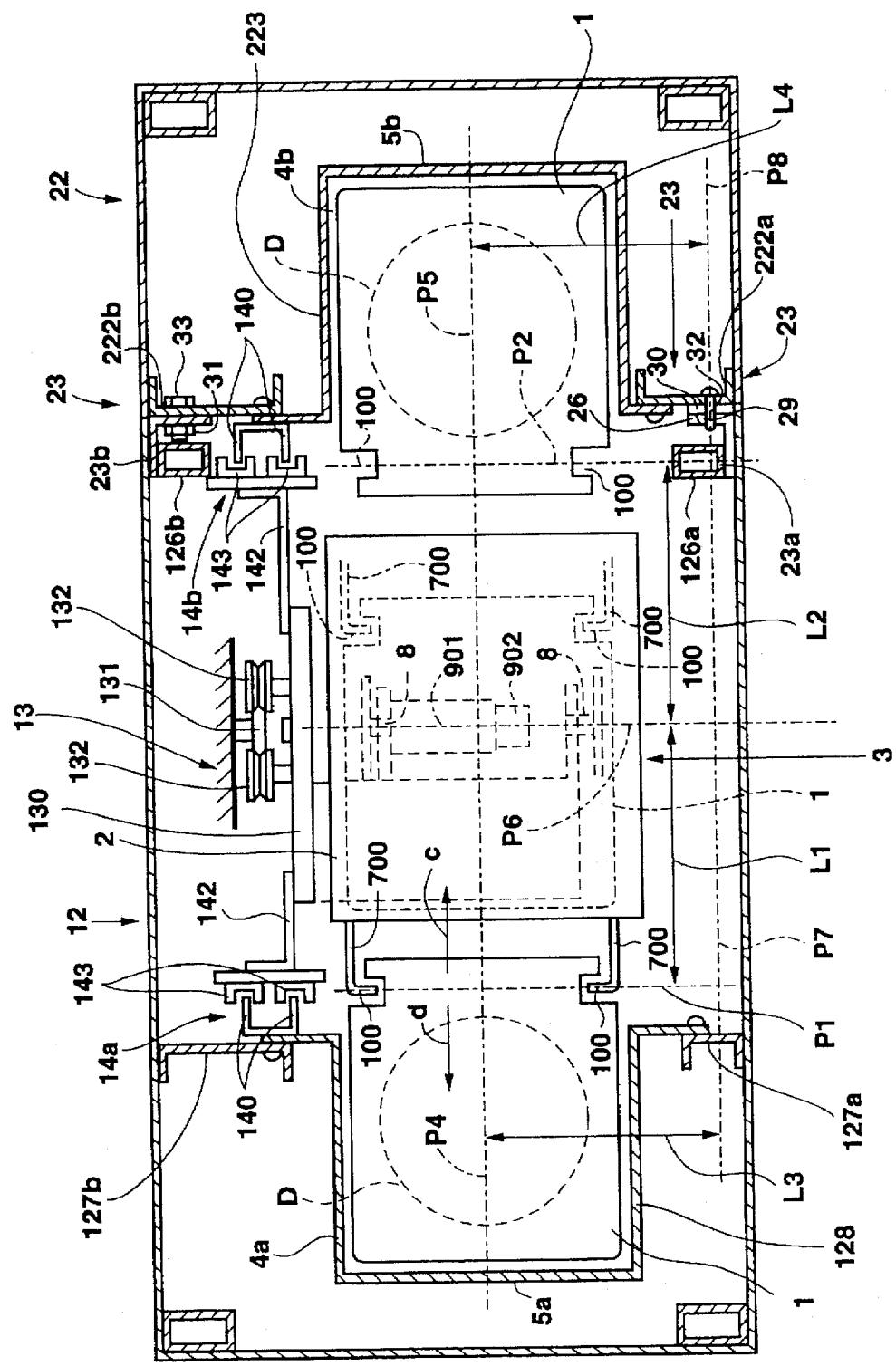
FIG. 3 is a plan view, partly broken away, showing the manner in which a cartridge is moved between a shelf and a carrier within a main unit.

Thereafter, the unidirectional loading/unloading mechanism is operable to move the right and left pawls 700 in the direction of the arrow c, as shown in FIG. 3, so as to pull the recesses 100 and move the cartridge 1 from the tray 152 into the cartridge loading space 203.

The cartridge conveyance mechanism 13 is again operable to move the carrier in the direction of the arrow a or b. Where a target shelf 4a is in the front array, then the right and left pawls 700 are caused to push the recesses 100 and move the cartridge 1 from the cartridge loading space 203 into that target shelf 4a as shown in FIG. 3. The right and left recesses 100 are then brought into alignment with the front reference line $P_1$.

Where a target shelf 4b is in the rear array, then the turning mechanism 9 is operable to rotate the carrier 2 about the pivot pin 8 by 180° in the direction of the arrow e. When the carrier 2 is moved to a position shown in a dotted-chain line in FIG. 10, the cartridge 1 and the right and left pawls 700 of the unidirectional loading/unloading mechanism 7 are directed toward the rear array of shelves 4b. Thereafter, the right and left pawls 700 are caused to insert the cartridge 1 into a target shelf 4b in the direction of the arrow d. The right and left recesses 100 are then brought into alignment with the rear reference line Automatic Change of Cartridges The carrier conveyance mechanism 13 is first operable to rapidly move the carrier 2 in the direction of the arrow a or b to a target shelf 4a or 4b.

At this time, the right and left pawls 700 are located at the reference lines $P_1$ or $P_2$ as shown in FIG. 1. The right and left pawls 700 are passed through the recesses 100 of the cartridges 1 during rapid movement of the carrier 2, while the target shelf 4a or 4b is being searched by the carrier stop position detecting mechanism 14. When the target shelf 4a or 4b is found, the pawls 700 are brought into engagement with the right and left recesses 100 of the cartridge 1 within that target shelf 4a or 4b.

To perform a search, the carrier 2 needs be rotated in the direction of the arrow e or f so as to invert the right and left pawls 700, as shown in a dotted-chain line in FIG. 10, depending on whether a target shelf is in the front array or the rear array. If this is necessary, the right and left pawls 700 must be withdrawn from the right and left recesses 100 and inserted into the carrier 2.

To this end, the carrier 2 is moved in the direction of the arrow a or b, as shown in FIG. 1, until it reaches one of the spaces 10a or 10b which is closest to the carrier 2 at that time. This permits removal of the right and left pawls 700 from the right and left recesses 100. The unidirectional loading/unloading mechanism 7 is then operable to move the right and left pawls 700 in the direction of the arrow c and pull them into the cartridge loading space 203.

Thereafter, the carrier 2 is rotated about the pivot pin 8 in the direction of the arrow e or f by 180°. This causes the right and left pawls 700 to be directed toward the front array of shelves 4a or the rear array of shelves 4b as shown in a dotted-chain line in FIG. 10.

Since the spaces 10a, 10b are offset from one another by an amount 2*$H_1$, the right and left pawls 700 are positioned to face against the other space 10a or 10b when the carrier 2 is rotated by 180°.

Immediately thereafter, the unidirectional loading/unloading mechanism 7 is able to move the right and left pawls 700 from the cartridge loading space 203 of the carrier 2 in the direction of the arrow d and to the reference line $P_2$ or $P_1$ within the other space 10a or 10b.

This completes turning of the carrier 2. Immediately thereafter, the carrier 2 is rapidly moved in the direction of the arrow a or b until it reaches a target shelf while the right and left pawls 700 are passed through the recesses 100 of the cartridges 1.

Again, the offset spaces 10a, 10b are defined in the front and rear arrays of shelves 4a, 4b. This arrangement permits the right and left pawls 700 to be removed from the right and left recesses 100 and enables rapid angular movement of the carrier 2 by 180°.

When the carrier 2 reaches the target shelf 4a or 4b, the right and left pawls 700 are engaged with the recesses 100 of the cartridge 1 located within the target shelf.

Figure 4:
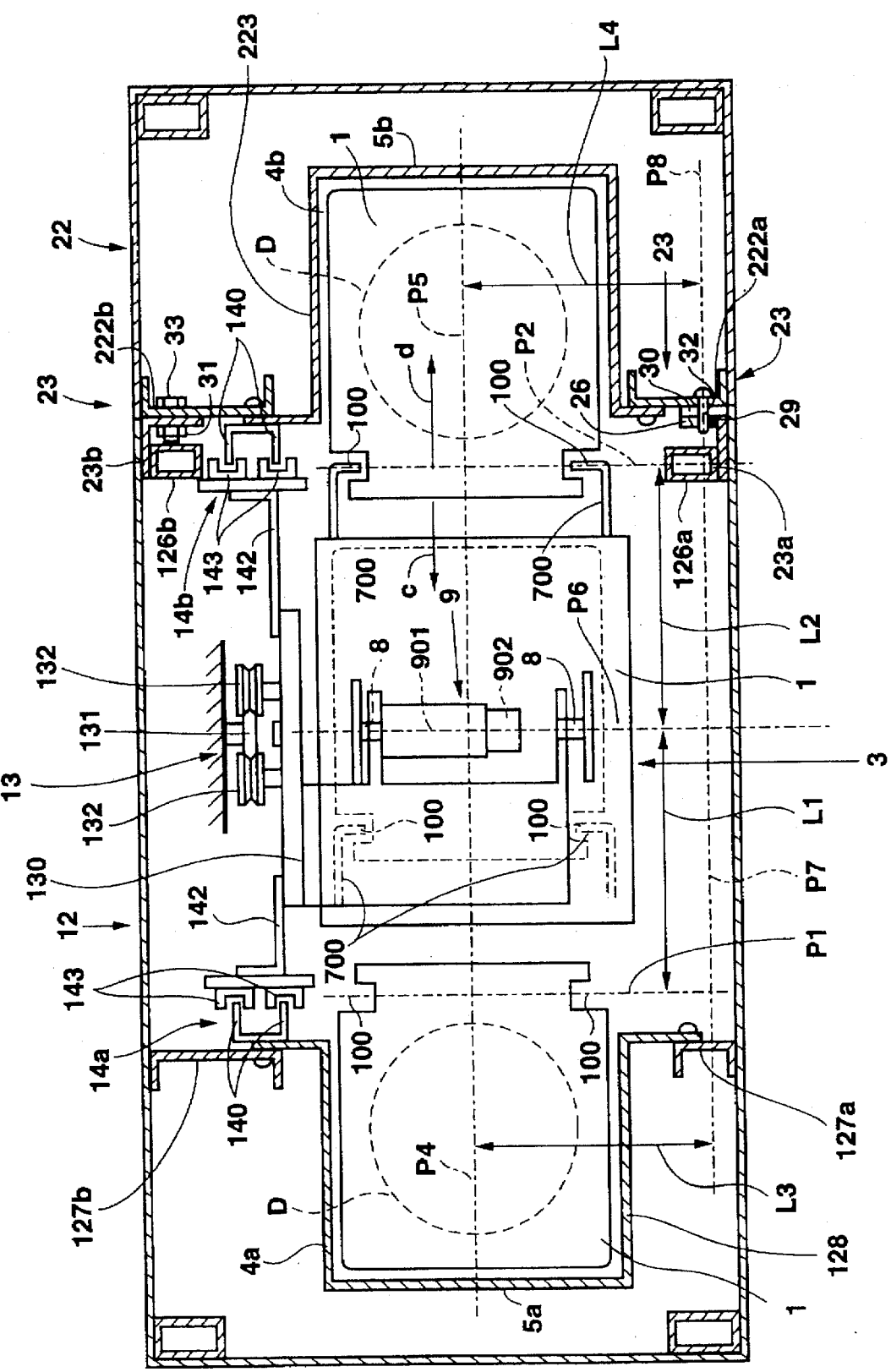
FIG. 4 is a plan view, partly broken away, showing the manner in which a cartridge is moved between a shelf and a carrier within an extension unit.

Thereafter, the unidirectional loading/unloading mechanism 7 is operable to move the right and left pawls 700 in the direction of the arrow c, as shown in FIG. 3 or 4, so as to pull the right and left recesses 100 of the cartridge 1 and move the cartridge 1 from the target shelf 4a, 4b into the cartridge loading space 203.

The carrier conveyance mechanism 13 is then operable to move the carrier 2 in the direction of the arrow a so as to rapidly move the carrier 2 to a target disc drive 6a, 6b. In this case, also, the carrier stop position detecting mechanism 14 is operable to search that target disc drive 6a, 6b.

The right and left pawls 700 are caused to push the right and left recesses 100 of the cartridge 1 so as to move the cartridge 1, in the direction of the arrow d, from the cartridge loading space 203 into the target disc drive 6a, 6b. The right and left recesses 100 are then brought into alignment with the reference line $P_1$ or $P_2$.

A cartridge loading mechanism (not shown) within each disc drive 6a, 6b is operable to move the cartridge 1 from an up position to a down position. Information is then automatically recorded on and/or reproduced from the optical disc D within the cartridge 1.

After recording and/or reproduction of the information has been completed, the cartridge 1 is moved in a reverse order and returned to the initial shelf 4a, 4b.

With the auto-changer as thus far described, the loading/unloading mechanism 7 is mounted on the carrier 2 and designed to load and unload the cartridge 1 on and from the one side 200 of the carrier 2 in the direction of the arrows c and d. This unidirectional loading/unloading mechanism 7 is much simpler, smaller and lighter than a bidirectional mechanism which loads and unloads the cartridge 1 on and from opposite sides 200, 201 of the carrier 2.

Moreover, the right and left pawls 700 of the unidirectional loading/unloading mechanism are engaged with the right and left recesses 100 so as to mechanically pull and the cartridge 1 in the direction of the arrow c and d for loading and unloading of the cartridge 1. This arrangement insures ready and safe loading and unloading of the cartridge 1 and is thus reliable. The unidirectional loading/unloading mechanism is simple in structure since loading and unloading can be effected only by driving the pawls 700 in the direction of the arrow c and d.

The unidirectional loading/unloading mechanism 7 needs not be of a tunnel structure, as opposed to such a bidirectional mechanism for loading and unloading the cartridge 1 from the opposite sides 200, 201. The cartridge loading slot 204 may be defined in only one side of the carrier 2, and the other side of the carrier 2 may be closed. This configuration gives the carrier 2 a substantial degree of strength and also, makes it small and light.

As such, no substantial power is required to transfer the carrier 2. It is also easy to rapidly move the carrier 2 in the direction of the arrow a and b and to automatically change the cartridges. The present invention brings about a significant reduction in the time required to automatically change the cartridges as well as in the consumption electric power and floor space.

Further, as the carrier 2 is freely rotated 180° by the turning mechanism 9, the cartridges 1 can be moved to and from the front and rear arrays of shelves 4a, 4b and the disc drives 6a, 6b arranged on opposite sides of the path 3 of travel of the carrier 2. This arrangement makes it possible to accommodate the cartridges 1 approximately twice as many as a conventional auto-changer does.

Although the present invention has been described with respect to its preferred embodiment, it is not limited thereto. Various modifications may be made without departing from the concept or spirit of the invention.

Specifically, in the previous embodiment, the unidirectional loading/unloading mechanism 7 is composed of the right and left pawls 700 engaged with the right and left recesses 100 so as to load and unload the cartridge 1 in the direction of the arrows c and d. Alternatively, a pair of motor driven right and left rollers or belts may be used to sandwich opposite sides of the cartridge 1 for loading and unloading the cartridge 1 in the direction of the arrows c and d.

The present invention is applied to an optical disc cartridge auto-changer, but may be applied to an auto-changer for changing cartridges which may contain a magnetic tape or other recording media.

The auto-changer of the present invention offers the following advantages.

The extension unit may be removably attached to the back of the main unit as the user's need arises. This addition will not increase the height of the auto-changer, but approximately doubles the number of shelves contained in the entire auto-changer without sacrificing the safety or operability.

Additionally, another array of forwardly directed shelves are arranged in a position opposite the shelves and drives in the main unit. The turning means is operable to turn the loading/unloading mechanism of the carrier between a position where the cartridges are loaded to the main unit or the drives, and a position where the cartridges are loaded to another array of shelves. The capacity of the auto-changer is doubled by simply increasing the number of the shelves.

The forwardly directed drives are mounted within the extension unit to record on and/or reproduce recording media. Mounting of the extension unit to the back of the main unit doubles the number of the shelves and drives.

The attachment mechanism allows for detachable attachment of the extension unit to the back of the main unit. The attachment mechanism includes a plurality of reference openings, reference pins adapted for insertion into the reference openings, a plurality of securing means, and means for adjusting the position of the reference openings and/or pins. The extension unit can readily be attached to the main unit by simply inserting the reference pins into the reference openings and securing the both units by the securing means. The position of the reference openings and/or pins is adjusted by adjusting means. This eliminates the need to adjust the shelves and drives in the extension unit relative to the carrier in the main unit. Again, the addition of the shelves and drives requires no adjustment and can be simply effected with high accuracy.

The turning means is mounted to the carrier and rotated by 180°. This reduces the size and floor space of the auto-changer.

The shelves and drives in the main unit and the shelves and/or drives in the extension unit are substantially symmetrically arranged with respect to the path of travel of the carrier. The shelves and/or drives in the main and extension units share mounting parts. This results in a decrease in the fabrication cost of the auto-changer.

The recording media within the cartridges are in the form of discs. The addition of the extension unit to the main unit doubles the number of the discs and/or drives.

What is claimed is:

1. An auto-changer which has access to recording media contained within cartridges, said auto-changer comprising:
   a first housing including a panel in which a first opening is defined to receive the cartridges, and a second opening formed in a side opposite to the panel;
   a first stocker including a first plurality of openings formed in its one side adjacent to the second opening of said first housing and adapted to removably receive the cartridges stacked substantially in parallel in a first direction, said first plurality of openings of said first stocker spaced apart from one another by a distance H1 along the first direction;
   a first drive mounted within said first housing and positioned to interfere with said first stocker in the first direction, said first drive including a port corresponding in position to said first plurality of openings and having access to said cartridges loaded and unloaded through said port;
   a second housing having a third opening at its one side;
   a second stocker mounted within said second housing and including a second plurality of openings formed in its one side adjacent to the third opening of said second housing and adapted to removably receive the cartridges stacked substantially in parallel in the first direction, said second plurality of openings of said second stocker spaced apart from one another by the distance H1 along the first direction and offset from said first plurality of openings by a selected integer multiple of the distance H1;
   a carrier mounted within said first housing and movable in the first direction, said carrier including a loading/unloading section for loading and unloading the cartridges, and a carrier body for holding the cartridges;
   means for connecting said first and second housings whereby the second opening of said first housing and the third opening of the second housing are communicated with one another to define an inner space; and
   means for turning said carrier between a first position and a second position, the second position offset along said first direction by an amount equal to said integer multiple of said distance H1, the first position wherein the loading/unloading section is able to load and unload the cartridges to and from the first stocker and the first drive and the second position, wherein said loading/unloading section is able to load and unload the cartridges to and from the second stocker.

2. An auto-changer according to claim 1, further comprising a second drive mounted within said second housing and positioned to interfere with said second stocker in the first direction, said second drive having a port corresponding in position to said second plurality of openings and having access to the cartridges loaded and unloaded through said port.

3. An auto-changer according to claim 2, wherein said first stocker and drive and said second stocker and drive are symmetrically positioned with respect to the path of travel of said carrier.

4. An auto-changer according to claim 1, wherein said means for connecting the first housing and the second housing comprises:
   reference openings;
   reference pins adapted for insertion into said reference openings;
   means for securing said first and second housings; and
   means for adjusting the position of the reference openings relative to said reference pins.

5. An auto-changer according to claim 1, wherein said first direction corresponds to the vertical axis and said means for turning is mounted to said carrier and turned about a horizontal axis by 180°, said horizontal axis extending substantially parallel to said first or second stocker.

6. An auto-changer according to claim 1, wherein said recording media are recording discs.

7. An auto-changer according to claim 1, wherein said selected integer multiple of the distance H1 is equal to 2*H1.

8. An auto-changer which has access to recording media contained within cartridges, said auto-changer comprising:
   a housing including a panel in which an opening is defined to receive the cartridges;
   a first stocker including a first plurality of openings formed in its one side and adapted to removably receive the cartridges stacked substantially in parallel in a first direction, said first plurality of openings of said first stocker spaced apart from one another by a distance H1 along the first direction;
   a drive mounted within said housing and positioned to interfere with said first stocker in the first direction, said drive including a port corresponding in position to said first plurality of openings and having access to said cartridges loaded and unloaded through said port;
   a second stocker mounted within said housing at a position opposite to said first stocker, said second stocker including a second plurality of openings formed in its one side adjacent to said first stocker and adapted to removably receive the cartridges stacked substantially in parallel in the first direction, said second plurality of openings of said second stocker spaced apart from one another by the distance H1 along the first direction and offset from said first plurality of openings by a selected integer multiple of the distance H1;

a carrier mounted within said housing and movable in the first direction, said carrier including a loading/unloading section for loading and unloading the cartridges, and a carrier body for holding the cartridges;

means for turning said carrier between a first position and a second position, the second position offset along said first direction by an amount equal to said integer multiple of said distance H1, said first position wherein said loading/unloading section is able to load and unload the cartridges to and from the first stocker and the drive, and said second position wherein said loading/unloading section is able to load and unload the cartridges to and from the second stocker.

9. An auto-changer according to claim 8, wherein said selected integer multiple of the distance H1 is equal to 2*H1.

* * * * *